United States Patent
Sethi et al.

(10) Patent No.: US 10,616,004 B1
(45) Date of Patent: Apr. 7, 2020

(54) METHODS AND SYSTEMS FOR CHANNEL ESTIMATION ENHANCEMENT FOR MULTI-STREAM PACKETS

(71) Applicant: Marvell International Ltd., Hamilton (BM)

(72) Inventors: Ankit Sethi, Pune (IN); Swaroop Venkatesh, San Ramon, CA (US); Sudhir Srinivasa, Campbell, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/011,017

(22) Filed: Jun. 18, 2018

Related U.S. Application Data

(63) Continuation of application No. 15/152,072, filed on May 11, 2016, now Pat. No. 10,003,477.

(60) Provisional application No. 62/160,858, filed on May 13, 2015.

(51) Int. Cl.
*H04L 25/02* (2006.01)
*H04L 27/26* (2006.01)

(52) U.S. Cl.
CPC ...... *H04L 25/0204* (2013.01); *H04L 25/0228* (2013.01); *H04L 27/2601* (2013.01)

(58) Field of Classification Search
CPC ............ H04L 25/0204; H04L 25/0228; H04L 27/2601
USPC ........................................................ 375/260
See application file for complete search history.

(56) References Cited

U.S. PATENT DOCUMENTS

| | | | |
|---|---|---|---|
| 6,608,863 B1 | 8/2003 | Onizawa et al. | |
| 7,058,002 B1 | 6/2006 | Kumagai et al. | |
| 8,040,982 B1 | 10/2011 | Nabar et al. | |
| 8,077,805 B1* | 12/2011 | Sarrigeorgidis | H04L 25/022 375/316 |
| 8,331,502 B1 | 12/2012 | Nabar et al. | |
| 8,611,476 B1 | 12/2013 | Nabar et al. | |
| 2004/0156309 A1 | 8/2004 | Chadha et al. | |
| 2005/0163238 A1 | 7/2005 | Fujii | |
| 2007/0268976 A1 | 11/2007 | Brink et al. | |
| 2009/0310722 A1 | 12/2009 | Lewis | |
| 2010/0095180 A1* | 4/2010 | Sawai | H04L 1/0048 714/746 |
| 2015/0023335 A1 | 1/2015 | Vermani et al. | |
| 2016/0073379 A1 | 3/2016 | Yang et al. | |

* cited by examiner

*Primary Examiner* — Michael R Neff

(57) ABSTRACT

Methods and systems are disclosed herein for performing channel estimation for multi-stream packets. The method may include receiving a data packet comprising a plurality of training fields, wherein the plurality of training fields comprises a training field, wherein the training field comprises a plurality of tones, and wherein the plurality of tones comprises a first tone and a second tone. The method may include modifying the first tone based on a predetermined signal associated with the first tone. The method may include storing the first tone in a data structure associated with the first tone. The method may include modifying the data structure based on the second tone.

20 Claims, 7 Drawing Sheets

100
VHT PACKET

| 102 | 104 | 106 | 108a | 108b | 110 | 112a | ... | 112b | 114 | 116a | ... | 116b |
|---|---|---|---|---|---|---|---|---|---|---|---|---|
| L-STF | L-LTF | L-SIG | VHT-SIGA1 | VHT-SIGA2 | VHT-STF | VHT-LTF1 | | VHT-LTFNss | VHT-SIGB | DATA-sym1 | | DATA-symM |

120
HT-MM PACKET

| 122 | 124 | 126 | 128a | 128b | 130 | 132a | ... | 132b | 136a | ... | 136b |
|---|---|---|---|---|---|---|---|---|---|---|---|
| L-STF | L-LTF | L-SIG | HT-SIG1 | HT-SIG2 | HT-STF | HT-LTF1 | | HT-LTFNss | DATA-sym1 | | DATA-symM |

140
HT-GF PACKET

| 150 | 152a | 148a | 148b | 152c | ... | 152b | 156a | ... | 156b |
|---|---|---|---|---|---|---|---|---|---|
| HT-STF | HT-LTF1 | HT-SIG1 | HT-SIG2 | HT-LTF2 | | HT-LTFNss | DATA-sym1 | | DATA-symM |

FIG. 1

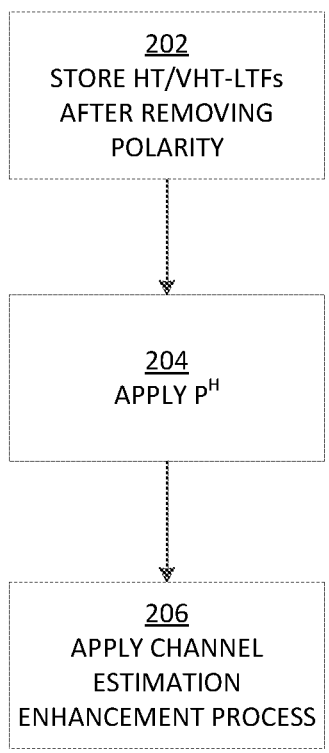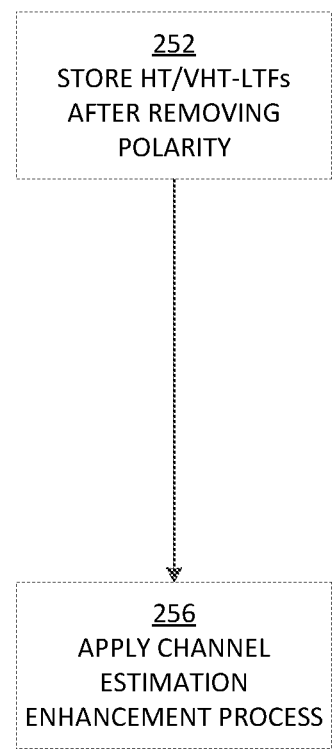
FIG. 2a
FIG. 2b

600

602
RECEIVE A DATA PACKET COMPRISING A PLURALITY OF TRAINING FIELDS, WHEREIN THE PLURALITY OF TRAINING FIELDS COMPRISE A TRAINING FIELD, WHEREIN THE TRAINING FIELD COMPRISES A PLURALITY OF TONES, AND WHEREIN THE PLURALITY OF TONES COMPRISE A FIRST TONE AND A SECOND TONE

604
MODIFY THE FIRST TONE BASED ON A PREDETERMINED SIGNAL ASSOCIATED WITH THE FIRST TONE

606
STORE THE FIRST TONE IN A DATA STRUCTURE ASSOCIATED WITH THE FIRST TONE

608
MODIFY THE DATA STRUCTURE BASED ON THE SECOND TONE

FIG. 6

METHODS AND SYSTEMS FOR CHANNEL ESTIMATION ENHANCEMENT FOR MULTI-STREAM PACKETS

CROSS-REFERENCE TO RELATED APPLICATION

This disclosure is a continuation of U.S. patent application Ser. No. 15/152,072, filed May 11, 2016 (now allowed), which in turn claims the benefit under 35 U.S.C. § 119(e) of U.S. Provisional Application No. 62/160,858, filed on May 13, 2015. The aforementioned applications are hereby incorporated herein by reference in their entireties.

FIELD OF USE

This disclosure relates to enhancing channel estimation techniques used to estimate the frequency response of a frequency division multiplexed communication channel used to transmit multi-stream packets.

BACKGROUND

The background description provided herein is for the purpose of generally presenting the context of the disclosure. Work of the inventors hereof, to the extent the work is described in the background section, as well as aspects of the description that may not otherwise qualify as prior art at the time of filing, are neither expressly or impliedly admitted as prior art against the present disclosure.

The concept of a digital communications channel is well known. In particular, it is known that a channel can affect the amplitude and phase of a signal carried by the channel. As a simple example, suppose a signal $\cos(\omega_0 t')$ is communicated in a channel, where $w_0$ is the angular frequency of the signal, $t'$ is the time associated with the transmission of the signal, and $t'=0$ represents the beginning of the transmission. Ideally, the signal that arrives at a receiver should have the same amplitude and phase; i.e., the received signal should be $\cos(\omega_0 t)$, where $t$ is the time associated with receiving the signal, and $t=0$ represents the beginning of the reception. The time $t=0$ may correspond to $t'=\tau$, for some transmission delay $\tau$. However, the received signal is seldom the same as the transmitted signal, even in a noiseless environment. Rather, (in the absence of noise) a receiver will more likely receive a signal $A\cos(\omega_0 t+\phi)$, where $A$ is a real number that shows the channel's effect on the amplitude of the signal, and $\phi$ is a real number that shows the channel's effect on the phase of the signal. The quantity $\phi$ is commonly referred to as "initial phase."

Although the example above shows a transmission signal that has only one frequency component $\omega=\omega_0$, a signal may include more than one frequency component. Additionally, a channel may affect each frequency component differently. Accordingly, the amplitude $A$ and the initial phase $\phi$ in the example above may only apply to frequency component $\omega=\omega_0$. From this point on, when a signal includes more than one frequency component, the amplitude and initial phase for each frequency component $\omega=\omega_i$ will be denoted with a corresponding subscript $i$.

A fundamental concept of digital communications is that amplitude and initial phase can be represented by a coordinate in a Cartesian plane. For example, an amplitude $A$ and an initial phase $\phi$ can be represented by the coordinate (x,y) where $x=A\cos(\phi)$ and $y=A\sin(\phi)$. Conversely, given a coordinate (x,y), an amplitude and initial phase can be computed by $A=\sqrt{x^2+y^2}$ and $$\phi = \arctan\left(\frac{y}{x}\right).$$

Another fundamental concept is that a coordinate (x,y) can also correspond to a complex number of the form (x+jy), where j is the imaginary unit. In this case, the x-axis represents the real part of a complex number, and the y-axis represents the imaginary part of a complex number. The benefits of representing amplitude and initial phase graphically as a coordinate point and mathematically as a complex number are that these representations allow changes in amplitude and initial phase to be easily illustrated and computed. The next paragraph shows an example of computing a channel's effects on a signal's amplitude and initial phase. In particular, an important computation involves Euler's formula, which states that a complex number (x+jy) can equivalently be expressed as $Ae^{j\Phi}$, where, as shown above, $A=\sqrt{x^2+y^2}$ and $$\phi = \arctan\left(\frac{y}{x}\right).$$

As an example, suppose a transmitted signal in a channel has frequency components of the form $A_i \cos(\omega_i t+\phi_i)$. In the absence of noise, the channel will generally alter the amplitude multiplicatively by a factor $K_i$, and alter the initial phase additively by a factor $\theta_i$, resulting in a received frequency component of the form $K_i A_i \cos(\omega_i t+\phi_i+\theta_i)$. Representing these amplitudes and initial phases mathematically, the amplitude and initial phase of the transmitted frequency components can be characterized by $A_i e^{j\Phi_i}$, and those of the received frequency component can be characterized by $K_i A_i e^{j(\Phi_i+\theta_i)} = A_i e^{j\Phi_i} K_i e^{j\theta_i}$. This shows two important things. First, it can be seen that the channel's effect on the amplitude and initial phase of the transmitted frequency component is captured by the term $K_i e^{j\theta_i}$. Second, if (in the absence of noise) the amplitude and initial phase of a received frequency component is $B_i e^{j\varphi_i}$, then the channel's effect on the transmitted amplitude and initial phase can be computed by $$K_i e^{j\theta_i} = \frac{B_i e^{j\varphi_i}}{A_i e^{j\phi_i}} = \frac{B_i}{A_i} e^{j(\varphi_i-\phi_i)};$$

i.e., $$K_i = \frac{B_i}{A_i}$$

and $\theta_i = \varphi_i - \phi_i$. When all of the effects $K_i e^{j\theta_i}$ across a continuous frequency range are quantified, the result is a function showing a channel's effect on signal amplitude and initial phase based on frequency. The function is referred to in the art as a "transfer function." A graph of a transfer function with respect to frequency is referred to as the channel's "frequency response."

The examples above assume an absence of noise in or affecting the channel. As mentioned above, a signal's frequency component can have amplitude and initial phase that are represented by a complex number $s_i$, and the channel's frequency response for the frequency component can be represented by a complex number $h_i$. In the absence of noise, the received frequency component has amplitude and initial phase given by $y_i = h_i \cdot s_i$. However, a channel's frequency response can vary over time. Therefore, the value of $h_i$ may need to be re-evaluated. One way in which this can be accomplished is by sending the receiver a "training signal," which is a predetermined signal that is known by the receiver. The training signal can include a frequency component that has predetermined amplitude and initial phase given by $s_i$. When the training signal arrives at the receiver with amplitude and initial phase $y_i$, the receiver can evaluate the channel's frequency response for the frequency component by computing $$h_i = \frac{y_i}{s_i}.$$

However, when noise is present, the channel's frequency response becomes more difficult to estimate. As used herein, the term "noise" refers to phenomena or effects, in or affecting a channel, that affect a signal carried on the channel and that are not already included by the channel's frequency response. Generally, when noise is present, the received frequency component becomes $y_i = h_i \cdot s_i + n_i$. In this situation, both $h_i$ and $n_i$ may vary over time, and it becomes more difficult to estimate the frequency response $h_i$ with certainty based on knowing only the training component $s_i$ and the received component $y_i$. In some embodiments, the noise $n_i$ may be represented by the symbol $z_i$. In some embodiments, the noise may also introduce a large and possibly random phase difference into the received signal $y_i$.

Ultimately, the desired operation of a receiver is to correctly detect a transmitted signal. To do so, a receiver can benefit from having a more accurate estimate of the channel's frequency response. Additionally, a channel estimate is useful for many kinds of operations, such as equalization. However, the presence of noise undermines the receiver's ability to produce an accurate channel estimate. Accordingly, there is continued interest in improving a receiver's channel estimation capabilities.

SUMMARY

In accordance with an embodiment of the present disclosure, a method is provided for channel estimation of multi-stream packets. The method may include receiving a data packet that includes a plurality of training fields, wherein the plurality of training fields include a training field, wherein the training field include a plurality of tones, and wherein the plurality of tones include a first tone and a second tone. The method may include modifying the first tone based on a predetermined signal associated with the first tone. The method may include storing the first tone in a data structure associated with the first tone. The method may include modifying the data structure based on the second tone.

In some embodiments, the data structure may be a first data structure, and the method may include modifying a second data structure associated with the second tone based on the first tone. In some embodiments, the method may include modifying the data structure based on the Hermitian of a polarity pattern matrix. In some embodiments, the method may include modifying the data structure to create a matrix wherein each column corresponds to a data stream of the data packet and each row corresponds to a receiver of the data packet. In some embodiments, each column of the matrix corresponds to a training field of the plurality of training fields, and each row of the matrix corresponds to a receiver of the data packet. In some embodiments, the second tone is associated with a data stream of the data packet and a receiver of the data packet, wherein a subset of the plurality of tones is associated with the data stream and the receiver, and the method includes storing each tone in the subset in a respective data structure associated with the respective tone, wherein the respective data structure is not modified based on any other tone of the plurality of tones.

In some embodiments, the data structure is a first data structure, and the method includes determining a mean deviation in phase difference associated with the second tone, comparing the mean deviation to a threshold, determining, based on the comparing, that the mean deviation is greater than the threshold, and storing the second tone in a second data structure associated with the second tone, wherein the second data structure is not modified based on any other tone of the plurality of tones. In some embodiments, the data structure is a first data structure, and the method includes determining a magnitude associated with the second tone, comparing the magnitude to a threshold, determining, based on the comparing, that the magnitude is less than the threshold, and storing the second tone in a second data structure associated with the second tone, wherein the second data structure is not modified based on any other tone of the plurality of tones.

In some embodiments, the method includes storing a third tone adjacent to the second tone in a third data structure associated with the third tone, wherein the third data structure is not modified based on any other tone of the plurality of tones. In some embodiments, the method includes modifying the data structure based on the second tone by determining an average phase difference, removing the average phase difference from the first tone and the second tone, smoothing the first tone based on the second tone, and combining the average phase difference with the first tone.

In accordance with an embodiment of the present disclosure, a system is provided for channel estimation of multi-stream packets. The system may include control circuitry configured to receive a data packet that includes a plurality of training fields, wherein the plurality of training fields include a training field, wherein the training field include a plurality of tones, and wherein the plurality of tones include a first tone and a second tone. The system may include control circuitry configured to modify the first tone based on a predetermined signal associated with the first tone. The system may include control circuitry configured to store the first tone in a data structure associated with the first tone. The system may include control circuitry configured to modify the data structure based on the second tone.

In some embodiments, the data structure may be a first data structure, and the system may include control circuitry configured to modify a second data structure associated with the second tone based on the first tone. In some embodiments, the system may include control circuitry configured to modify the data structure based on the Hermitian of a polarity pattern matrix. In some embodiments, the system may include control circuitry configured to modify the data structure to create a matrix wherein each column corresponds to a data stream of the data packet and each row corresponds to a receiver of the data packet. In some embodiments, each column of the matrix corresponds to a training field of the plurality of training fields, and each row of the matrix corresponds to a receiver of the data packet. In some embodiments, the second tone is associated with a data stream of the data packet and a receiver of the data packet, wherein a subset of the plurality of tones is associated with the data stream and the receiver, and the system includes control circuitry configured to store each tone in the subset in a respective data structure associated with the respective tone, wherein the respective data structure is not modified based on any other tone of the plurality of tones.

In some embodiments, the data structure is a first data structure, and the system includes cpmtrp; circuitry configured to determine a mean deviation in phase difference associated with the second tone, compare the mean deviation to a threshold, determine, based on the comparing, that the mean deviation is greater than the threshold, and store the second tone in a second data structure associated with the second tone, wherein the second data structure is not modified based on any other tone of the plurality of tones. In some embodiments, the data structure is a first data structure, and the system includes control circuitry configured to determine a magnitude associated with the second tone, compare the magnitude to a threshold, determine, based on the comparing, that the magnitude is less than the threshold, and store the second tone in a second data structure associated with the second tone, wherein the second data structure is not modified based on any other tone of the plurality of tones.

In some embodiments, the system includes control circuitry configured to store a third tone adjacent to the second tone in a third data structure associated with the third tone, wherein the third data structure is not modified based on any other tone of the plurality of tones. In some embodiments, the system includes control circuitry configured to modify the data structure based on the second tone by determining an average phase difference, removing the average phase difference from the first tone and the second tone, smoothing the first tone based on the second tone, and combining the average phase difference with the first tone.

BRIEF DESCRIPTION OF THE DRAWINGS

Further features of the disclosure, its nature, and various advantages will be apparent upon consideration of the following detailed description, taken in conjunction with the accompanying drawings, in which:

FIG. 1 shows exemplary multi-stream packets, in accordance with some embodiments of the present disclosure;

FIG. 2*a* shows an exemplary process for enhancing channel estimation using matrix $P^H$, in accordance with some embodiments of the present disclosure;

FIG. 2*b* shows an exemplary process for enhancing channel estimation without matrix $P^H$, in accordance with some embodiments of the present disclosure;

FIG. 6 shows an exemplary process for channel estimation for multi-stream packets, in accordance with some embodiments of the present disclosure.

DETAILED DISCLOSURE

Figure 3:
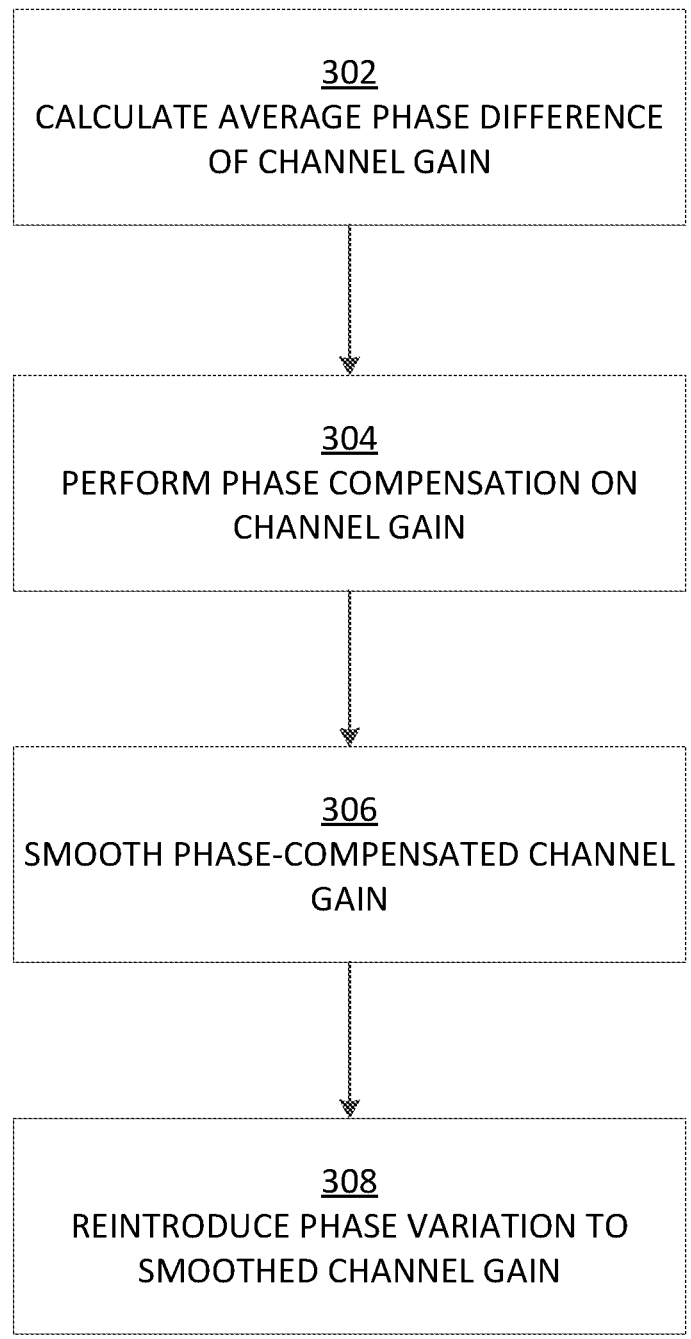
FIG. 3 shows an exemplary process for performing channel estimation enhancement, in accordance with some embodiments of the present disclosure.

To provide an overall understanding of the disclosure, certain illustrative embodiments will now be described, including systems and methods for efficiently packaging multiple dies on the same substrate. However, the systems and methods described herein may be adapted and modified as is appropriate for the application being addressed, and the systems and methods described herein may be employed in other suitable applications.

FIG. 1 shows exemplary multi-stream packets incorporating some embodiments of the present disclosure. Although only three exemplary packets 100, 120, and 140 respectively associated with the Institute of Electrical and Electronics Engineers (IEEE) 802.11n and 802.11ac communications standards are shown, it is understood that any multi-stream orthogonal frequency-division multiple access (OFDMA) packet may be transmitted in accordance with the scope of this disclosure. For example, any OFDMA packets may be transmitted in accordance with the scope of this disclosure.

Very-high throughput (VHT) packet 100 may be used with the 802.11ac communications standard, although it may also be compatible with other communications standards. VHT packet 100 may include the following fields: non-HT short training field (L-STF 102), non-HT long training field (L-LTF 104), non-HT signal field (L-SIG 106), first VHT signal-A field (VHT-SIGA1 108*a*), second VHT signal-A field (VHT-SIGA2 108*b*), VHT short training field (VHT-STF 110), VHT signal-B field (VHT-SIGB 114), and data fields (DATA-sym1 116*a* to DATA-symM 116*b*). There are m data fields in VHT packet 100. VHT packet 100 may also include ss VHT long training fields (VHT-LTF1 112*a* to VHT-LTFNss 112*b*), where ss represents the number of data streams being used in the present transmission. The numbers m and ss may vary for different packets.

High throughput mixed mode (HT-MM) packet 120 may be used with the 802.11n communications standard, although it may also be compatible with other communications standards. HT-MM packet 120 may include some fields that are also in VHT packet 100. HT-MM packet 120 may include the following fields: non-HT short training field (L-STF 122), non-HT long training field (L-LTF 124), non-HT signal field (L-SIG 126), first HT signal field (HT-SIG1 128*a*), second HT signal field (HT-SIG2 128*b*), HT short training field (HT-STF 130), and data fields (DATA-sym1 136*a* to DATA-symM 136*b*). HT-MM packet 120 may also include ss HT long training fields (HT-LTF1 132*a* to HT-LTFNss 132*b*).

HT Greenfield (HT-GF) packet 140 may be used with the 802.11n communications standard, although it may also be compatible with other communications standards. HT-GF packet 140 may include the following fields: HT short training field (HT-STF 150), first HT signal field (HT-SIG1 148*a*), second HT signal field (HT-SIG2 148*b*), and data fields (DATA-sym1 156*a* to DATA-symM 156*b*). HT-GF packet 140 may also include ss HT long training fields (HT-LTF1 152*a*, and HT-LTF2 152*c* to HT-LTFNss 152*b*).

Each packet 100, 120, and 140 may include training symbols used for channel estimation in their respective ss long training fields. Each packet 100, 120, and 140 may be received by a receiver, such as an antenna, in computing device 700. Computing device 700 may include any number of antennas. In some embodiments, each receiver may receive all fields of each received packet. In some embodiments, each receiver may receive only a subset of fields of each received packet.

FIG. 2*a* shows an exemplary process 200 for enhancing channel estimation using matrix $P^H$ incorporating embodiments of the present disclosure. Process 200 may be used for channel estimation in accordance with the information provided by any of multi-stream packets 100, 120, and 140. Process 200 may be performed by computing device 700 as described in relation to FIG. 7.

Process 200 begins at block 202. At block 202, computing device 700 stores either HT-LTF or VHT-LTF symbols after removing their polarities. HT-LTF symbols may be received as part of HT-MM packet 120 in fields HT-LTF1 132a to HT-LTFNss 132b, or as part of HT-GF packet 140 in fields HT-LTF1 152a, and HT-LTF2 152c to HT-LTFNss 152b. VHT-LTF symbols may be received as part of VHT packet 100 in fields VHT-LTF1 112a to VHT-LTFNss 112b.

To store the HT-LTF or VHT-LTF symbols after removing their polarities, computing device 700 may first compute the Fast-Fourier Transform (FFT) associated with the received LTF symbols. The output of the FFT may be the following:

$$(y_k)_{rx,ltf}$$

wherein, k is a frequency or tone number between 1 and N;
rx is a receiver number between 1 and nRX, wherein nRX is the total number of receivers used by device 700; and
ltf is an LTF symbol number between 1 and nLTF, wherein nLTF is the number of LTF symbols in the received data packets.

Computing device 700 may remove the polarity of the FFT output using the following equation for all $1 \le k \le N$, $1 \le rx \le nRX$, and $1 \le ltf \le nLTF$:

$$(\tilde{h}_k)_{rx,ltf} = \frac{(y_k)_{rx,ltf}}{s_k}$$

wherein, $s_k$ is the symbol originally transmitted in the data packets. The value of $s_k$ may be predetermined and stored in a location accessible by device 700. Hence, $s_k$ may be known to device 700.

Computing device 700 may store the resulting values of $(\tilde{h}_k)_{rx,ltf}$ for each k, rx, and ltf in the ranges $1 \le k \le N$, $1 \le rx \le nRX$, and $1 \le ltf \le nLTF$. Each of the resulting values may have been calculated sequentially or in parallel. The resulting values may be stored in the following matrix:

$$\tilde{H}_k = \begin{bmatrix} (\tilde{h}_k)_{1,1} & (\tilde{h}_k)_{1,2} & \cdots & (\tilde{h}_k)_{1,nLTF} \\ (\tilde{h}_k)_{2,1} & (\tilde{h}_k)_{2,2} & \cdots & (\tilde{h}_k)_{2,nLTF} \\ \cdots & \cdots & \cdots & \cdots \\ (\tilde{h}_k)_{nRX,1} & (\tilde{h}_k)_{nRX,2} & \cdots & (\tilde{h}_k)_{nRX,nLTF} \end{bmatrix}$$

Process 200 proceeds to block 204. At block 204, computing device 700 applies matrix $P^H$ to the HT-LTF and VHT-LTF values with removed polarity stored in block 202. $P^H$ represents a Hermitian of polarity pattern matrix $P_{HTLTF}$ which is defined in the 802.11n, 802.11ac, and 802.11ah specifications. For example, the 4×4 polarity pattern matrix $P_{HTLTF}$, to be used when nRX=4 and nTLF=4, is:

$$P_{HTLTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

The result of applying matrix $P^H$ to the HT-LTF and VHT-LTF values with removed polarity stored in block 202 may be calculated as follows:

$$\hat{H}_k = \tilde{H}_k P^H$$

wherein, $$\hat{H}_k = \begin{bmatrix} (\hat{h}_k)_{1,1} & (\hat{h}_k)_{1,2} & \cdots & (\hat{h}_k)_{1,nSS} \\ (\hat{h}_k)_{2,1} & (\hat{h}_k)_{2,2} & \cdots & (\hat{h}_k)_{2,nSS} \\ \cdots & \cdots & \cdots & \cdots \\ (\hat{h}_k)_{nRX,1} & (\hat{h}_k)_{nRX,2} & \cdots & (\hat{h}_k)_{nRX,nSS} \end{bmatrix}$$

and wherein, nSS represents a number of data streams ss in the received packet.

Computing device 700 may compute $(\hat{h}_k)_{rx,ss}$ for each k, rx, and ss in the ranges $1 \le k \le N$, $1 \le rx \le nRX$, and $1 \le ss \le nSS$. nSS may or may not have the same value as nLTF. Each $(\hat{h}_k)_{rx,ss}$ may represent the $k^{th}$ point of the FFT of the channel seen by receiver rx and data stream ss. Each $(\hat{h}_k)_{rx,ss}$ may be referred to as the channel estimate of the channel seen by receiver rx and data stream ss. This channel estimate may be further enhanced as described below.

As referred to herein, a channel profile may be a set of tones having either the same rx and ss values, or having the same rx and ltf values. Each channel profile may be received through a separate channel by receivers. As referred to herein, a tone is a single element in a FFT output.

In some embodiments, the data packets may be transmitted and received using STBC (space-time block code) in accordance with the 802.11n communications protocol. If the data packets are using STBC, the packet will not have nSS data streams. Instead, it will include nSTS space-time streams. Channel estimation in accordance with this disclosure can be performed for these data packets as well, by replacing mentions of "ss" and "nSS" with "sts" and "nSTS" respectively, wherein $1 \le sts \le nSTS$.

Process 200 proceeds to block 206. At block 206, computing device 700 applies a channel estimation enhancement process to the matrix $\hat{H}_k$ computed in block 204. The channel estimation enhancement process includes operations as described in relation to FIG. 3. The enhancement process may use different values for each receiver rx and data stream ss.

FIG. 2b shows an exemplary process 250 for enhancing channel estimation without matrix $P^H$ incorporating embodiments of the present disclosure. Process 250 begins at block 252. At block 252, computing device 700 stores HT-LTF and VHT-LTF values after removing their polarities. Computing device 700 may execute block 252 in a manner similar to that described in relation to block 202.

Process 250 proceeds to block 256. At block 256, computing device 700 applies a channel estimation enhancement process to the matrix $\hat{H}_k$ stored during block 252. Since process 250 does not use matrix $P^H$, the channel enhancement process in process 250 is performed on matrix $\tilde{H}_k$ instead of matrix $\hat{H}_k$. Hence, the channel enhancement process in process 250 will process values $(\tilde{h}_k)_{rx,ltf}$ instead of values $(\hat{h}_k)_{rx,ss}$. The channel estimation enhancement process may be performed as described in relation to FIG. 3.

FIG. 3 shows an exemplary process 300 for performing channel estimation enhancement incorporating embodiments of the present disclosure. Process 300 may be performed, with some variations, during both blocks 206 and 256 described above. For block 206, process 300 may be performed for each k, rx, and ss in the ranges 1≤k≤N, 1≤rx≤nRX, and 1≤ss≤nSS. For block 256, process 300 may be performed for each k, rx, and ltf in the ranges 1≤k≤N, 1≤rx≤nRX, and 1≤ltf≤nLTF. More information about channel estimation enhancement may be found in U.S. Provisional Application No. 60/727,815, filed Oct. 18, 2005, U.S. Provisional Application No. 60/799,922, filed May 12, 2006, U.S. Pat. No. 8,040,982, filed Jul. 6, 2006, U.S. Pat. No. 8,331,502, filed Sep. 19, 2011, and U.S. Pat. No. 8,611,476, filed Dec. 5, 2012, all of which are incorporated herein by reference in their entireties.

Process 300 begins as block 302. At block 302, computing device 700 calculates an average phase difference of the channel gain. For block 206, computing device 700 may first compute a phase of the channel gain for each k, rx, and ss in the ranges 1≤k≤N, 1≤rx≤nRX, and 1≤ss≤nSS:

$$(\hat{\varnothing}_k)_{rx,ss} = \arg\{(\hat{h}_k)_{rx,ss}\}$$

Computing device 700 may then compute the average phase difference associated with the calculated phase as follows:

$$(\Delta\hat{\varnothing})_{rx,ss} = \frac{\sum_{k=1}^{N-1} [(\hat{\varnothing}_k)_{rx,ss} - (\hat{\varnothing}_{k+1})_{rx,ss}]}{N-1}$$

For block 256, the average phase difference may be calculated in a similar manner. Specifically, computing device 700 may first compute a phase of the channel gain for each k, rx, and ltf in the ranges 1≤k≤N, 1≤rx≤nRX, and 1≤ltf≤nLTF:

$$(\tilde{\varnothing}_k)_{rx,ltf} = \arg\{(\tilde{h}_k)_{rx,ltf}\}$$

Computing device 700 may then compute the average phase difference associated with the calculated phase as follows:

$$(\Delta\tilde{\varnothing})_{rx,ltf} = \frac{\sum_{k=1}^{N-1} [(\tilde{\varnothing}_k)_{rx,ltf} - (\tilde{\varnothing}_{k+1})_{rx,ltf}]}{N-1}$$

In some embodiments, computing device 700 may compute the average phase difference for a subset of individual phase differences instead of averaging the N−1 phase differences as shown above. This may reduce the complexity of the computation for both blocks 206 and 256.

The average phase difference is computed separately for each channel, and used to smooth tones in that channel. Hence, different channels are smoothed using their own different average phase differences. Computing device 700 can thus ensure the smoothing values are appropriate for the channel.

Process 300 proceeds to block 304. At block 304, computing device 700 performs phase compensation on the channel gain using the average phase difference computed in block 302. Computing device 700 may perform the phase compensation for block 206 by computing $(\hat{g}_k)_{rx,ss}$ as follows:

$$(\hat{g}_k)_{rx,ss} = (\hat{h}_k)_{rx,ss} e^{-j(k-1)(\Delta\hat{\varnothing})_{rx,ss}}$$

Similarly, computing device 700 may perform the phase compensation for block 256 by computing $(\tilde{g}_k)_{rx,ltf}$ as follows:

$$(\tilde{g}_k)_{rx,ltf} = (\tilde{h}_k)_{rx,ltf} e^{-j(k-1)(\Delta\tilde{\varnothing})_{rx,ltf}}$$

Process 300 may proceed to block 306. At block 306, computing device 700 may smooth the phase-compensated channel gain computed during block 306. For block 206, the smoothing may be performed using the following equation:

$$(\hat{g}_{smoothed,k})_{rx,ss} = \frac{((\hat{g}_{k-1})_{rx,ss} + (\hat{g}_k)_{rx,ss} + (\hat{g}_{k+1})_{rx,ss})}{3}$$

Similarly, for block 256, the smoothing may be performed using the following equation:

$$(\tilde{g}_{smoothed,k})_{rx,ltf} = \frac{((\tilde{g}_{k-1})_{rx,ltf} + (\tilde{g}_k)_{rx,ltf} + (\tilde{g}_{k+1})_{rx,ltf})}{3}$$

Although block 306 is shown as computing $(\hat{g}_{smoothed,k})_{rx,ss}$ for block 206 by computing the average of three phase-compensated channel gain values, it is understood that any number of phase-compensated channel gain values may be used to compute $(\hat{g}_{smoothed,k})_{rx,ss}$. Similarly, it is understood that any number of phase-compensated channel gain values may be used to compute $(\tilde{g}_{smoothed,k})_{rx,ltf}$.

Process 300 proceeds to block 308. At block 308, computing device 700 reintroduces phase variation to the phase-compensated smoothed channel gain computed in block 306. For block 206, computing device 700 may reintroduce the phase variation as follows:

$$(\hat{h}_{smoothed,k})_{rx,ss} = \left(\hat{g}_{smoothed,k} e^{j(k-1)(\Delta\hat{\varnothing})_{rx,ss}}\right)_{rx,ss}$$

Similarly, for block 256, computing device 700 may reintroduce the phase variation as follows:

$$(\tilde{h}_{smoothed,k})_{rx,ltf} = \left(\tilde{g}_{smoothed,k} e^{j(k-1)(\Delta\tilde{\varnothing})_{rx,ltf}}\right)_{rx,ltf}$$

Figure 4:
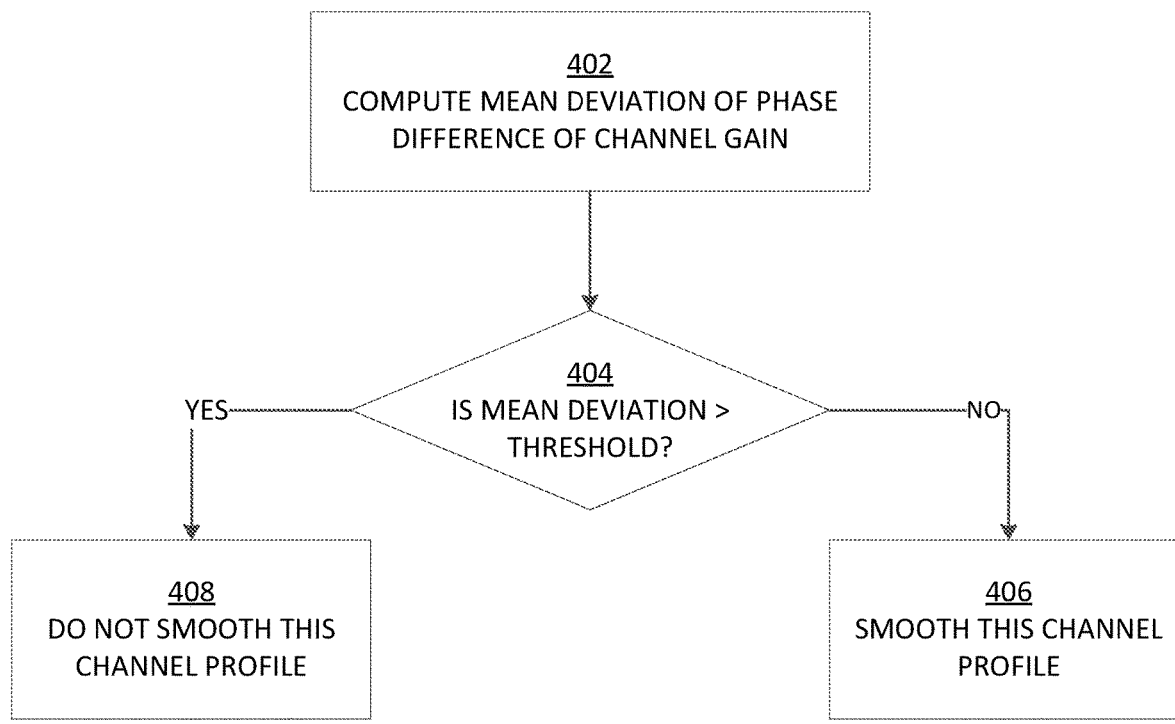
FIG. 4 shows an exemplary process for excluding channel profiles, in accordance with some embodiments of the present disclosure.

FIG. 4 shows an exemplary process 400 for excluding a channel profile incorporating embodiments of this disclosure. Process 400 may be used to exclude certain channel profiles from the process described in relation to blocks 206 and 256. Process 400 may be executed between blocks 204 and 206 for process 200. Process 400 may be executed between blocks 252 and 256 for process 250.

Process 400 may be executed to exclude channel profiles that have narrow coherence bandwidth. In other words, process 400 may be executed to exclude channel profiles in which tones are not significantly correlated with adjacent tones. Since the smoothing process described in relation to blocks 206 and 256 uses adjacent tones to smooth tones, the smoothing process may not be appropriate for channel profiles that have narrow coherence bandwidth. Smoothing these channel profiles may degrade data detection performance. Process 400 can be used to identify these channel profiles, so that they can be excluded from the smoothing processes described in relation to blocks 206 and 256.

At block 402, computing device 700 computes a mean deviation of phase difference of a channel gain. For process 200, computing device 700 may compute the mean deviation using the following equation:

$$(\Delta \emptyset_e)_{rx,ss} = \frac{\sum_{k=1}^{N-1} |(\hat{\emptyset}_{k-1})_{rx,ss} - (\hat{\emptyset}_k)_{rx,ss} - (\hat{\emptyset})_{rx,ss}|^2}{N-1}$$

Computing device 700 may also compute the mean deviation using the following simpler equation:

$$(\Delta \emptyset_e)_{rx,ss} = \frac{\sum_{k=1}^{N-1} |(\hat{\emptyset}_{k-1})_{rx,ss} - (\hat{\emptyset}_k)_{rx,ss} - (\hat{\emptyset})_{rx,ss}|}{N-1}$$

For process 250, computing device 700 may compute the mean deviation using the following equation:

$$(\Delta \emptyset_e)_{rx,ltf} = \frac{\sum_{k=1}^{N-1} |(\hat{\emptyset}_{k-1})_{rx,ltf} - (\hat{\emptyset}_k)_{rx,ltf} - (\hat{\emptyset})_{rx,ltf}|^2}{N-1}$$

Computing device 700 may also compute the mean deviation using the following simpler equation:

$$(\Delta \emptyset_e)_{rx,ltf} = \frac{\sum_{k=1}^{N-1} |(\hat{\emptyset}_{k-1})_{rx,ltf} - (\hat{\emptyset}_k)_{rx,ltf} - (\hat{\emptyset})_{rx,ltf}|}{N-1}$$

In some embodiments, computing device 700 may compute the mean deviation by averaging only a subset of tones instead of all N tones. This may further simplify the calculation and make it faster.

At block 404, computing device 700 determines whether the mean deviation is greater than a predetermined threshold. Computing device 700 may receive the predetermined threshold from a user, or may use a default threshold value. Computing device 700 may use a different threshold value for each different k, rx, ss, and/or ltf value. If computing device 700 determines the mean deviation is not greater than the threshold, process 400 proceeds to block 406. At block 406, computing device 700 smoothes the current channel profile as described in relation to blocks 206 and 256. Process 400 may then be repeated with another channel profile. At block 404, if computing device 700 determines the mean deviation is greater than the threshold, process 400 proceeds to block 408.

At block 408, computing device 700 determines the current channel profile should not be smoothed. Computing device 700 may store an identifier of the current channel profile in a list of channel profiles to be excluded. Hence, in block 206, $(\hat{h}_k)_{rx,ss}$ will not be smoothed for the channel identified by rx and ss, for all $1 \leq k \leq N$. In other words, $(\hat{h}_{smoothed,k})_{rx,ss} = (\hat{h}_k)_{rx,ss}$ for the channel identified by rx and ss, for all $1 \leq k \leq N$. Similarly, in block 256, $(\tilde{h}_k)_{rx,ltf}$ will not be smoothed for the channel identified by rx and ltf, for all $1 \leq k \leq N$. In other words, $(\tilde{h}_{smoothed,k})_{rx,ltf} = (\tilde{h}_k)_{rx,ltf}$ for the channel identified by rx and ltf, for all $1 \leq k \leq N$.

Figure 5:
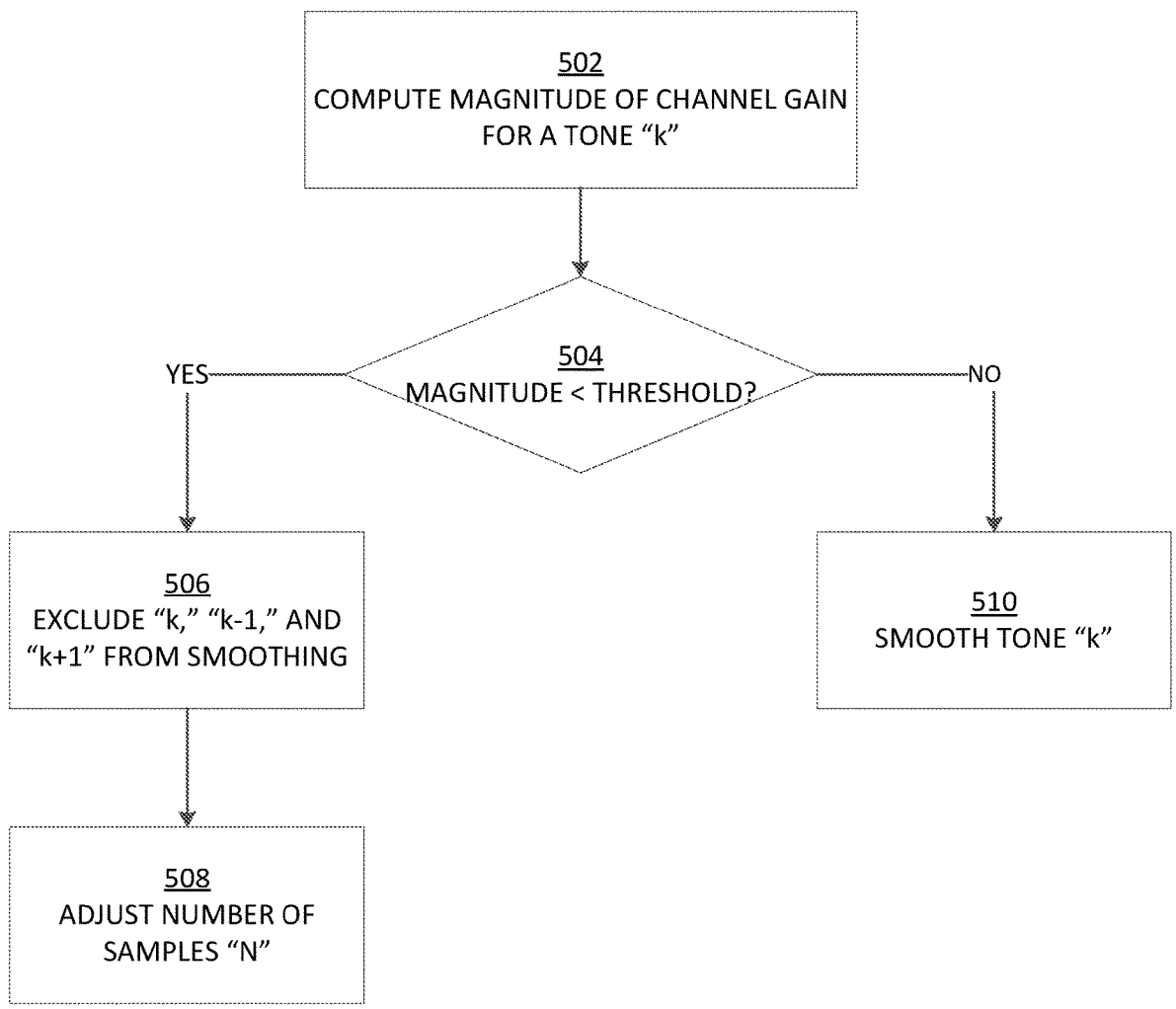
FIG. 5 shows an exemplary process for excluding channel tones, in accordance with some embodiments of the present disclosure.

FIG. 5 shows an exemplary process 500 for excluding channel tones. Process 500 may be used to exclude certain channel tones from the process described in relation to blocks 206 and 256. Process 500 may be executed between blocks 204 and 206 for process 200. Process 500 may be executed between blocks 252 and 256 for process 250. Process 500 may be executed by itself, or in conjunction with process 400. Processes 400 and 500 may be executed alone or in combination with each other. Processes 400 and 500 may be executed sequentially or in parallel. In some embodiments, processes 200 and 250 may be executed without processes 400 and 500. That is, process 400 and 500 may be optional in some embodiments.

Process 500 may be used to exclude tones in a channel profile that are not coherent in frequency. The non-coherent tones may not be correlated with adjacent tones. Since the smoothing process described in relation to blocks 206 and 256 uses adjacent tones to smooth tones, the smoothing process may not be appropriate for tones that are not coherent. Smoothing these tones may degrade data detection performance. Process 500 can be used to identify these tones within each channel profile, so that they can be excluded from the smoothing processes described in relation to blocks 206 and 256.

At block 502, computing device 700 computes the magnitude of channel gain for a particular tone "k" in a channel. Non-coherent tones can be calculated for process 200 by computing, for some $1 \leq k \leq N$ in a channel profile identified by rx and ss, the following:

$$\text{mag}(\hat{h}_k)_{rx,ss}$$

Similarly, non-coherent tones can be calculated for process 250 by computing, for some $1 \leq k \leq N$ in a channel profile identified by rx and ltf, the following:

$$\text{mag}(\tilde{h}_k)_{rx,ltf}$$

At block 504, computing device 700 determines whether the magnitude of channel gain computed in block 502 is less than a threshold. The threshold may be received from a user, or may be a default predetermined value. Computing device 700 may use a different threshold value for each different k, rx, ss, and/or ltf value. If computing device 700 determines the magnitude is less than the threshold, process 500 proceeds to block 506. If computing device 700 determines the magnitude is not less than the threshold, computing device 700 proceeds to block 510.

At block 506, computing device 700 excludes the tones k, k−1, and k+1 from smoothing. Hence, for tones k, k−1, and k+1 in process 200:

$$(\hat{h}_{smoothed,k})_{rx,ss} = (\hat{h}_k)_{rx,ss}$$

Similarly, for tones k, k−1, and k+1 in process 250:

$$(\tilde{h}_{smoothed,k})_{rx,ltf} = (\tilde{h}_k)_{rx,ltf}$$

Computing device 700 may store a list of all tones and channel profiles excluded from smoothing due to the results of processes 400 and 500. Computing device 700 may compare the k, rx, ss, and/or ltf values of each new tones and channel being smoothed to the values in the list. If the values for the current tone or the current channel match values in the list, computing device 700 may determine the current tone or current channel will not be smoothed. Computing device 700 may check whether any new value to be added to the list is already present in the list. If so, computing device 700 may not add a duplicate new value to the list.

At block 508, computing device 700 adjusts number of samples "N". The number of samples "N" is used to calculate average phase difference of channel gain in block 302. If tones k, k−1, and k+1 were excluded at block 506, computing device 700 may reduce the value of N by 3. This accounts for the fact that the tones will not be used in the calculation in blocks 302-308.

At block 510, computing device 700 smoothes tone k as described in relation to blocks 206 and 256. Computing device 700 then repeats process 500 for a different tone "k" that has not yet been used in process 500. Computing device 700 may perform process 500 for tones that were excluded from smoothing in block 506. For example, if tone k=2 and computing device 700 executes block 506, tones k=1 and k=3 will also be excluded from smoothing. However, process 500 will still be executed for excluded tones k=1 and k=3. In another example, if the current tone is k=2, and computing device 700 determines tone k=3 has not been used in process 500 or excluded, computing device 700 may execute process 500 with tone k=3. Computing device 700 may repeat process 500 until all tones 1≤k≤N have either been used in process 500 for a channel.

In addition to the processes described in relation to FIGS. 4 and 5, tones may be excluded from smoothing based on the following considerations. In some embodiments, computing device 700 may exclude pilot tones (or pilot tones and tones adjacent to pilot tones) from smoothing. As referred to herein, pilot tones are predetermined tones which are known to the receiver. In some embodiments, computing device 700 may exclude DC tones (or DC tones and tones adjacent to DC tones) from smoothing. There may be at least one DC tone in each received data packet. In some embodiments, computing device 700 may exclude tones near the guard band of a channel of a received data packet from smoothing. The guard band of a channel with tones from 1 to N may be tones near 1 and N.

FIG. 6 shows an exemplary process 600 for channel estimation for multi-stream packets, incorporating embodiments of the present disclosure. Process 600 may be performed by computing device 700 to perform channel estimation for all types of packets discussed in relation to FIG. 1.

At block 602, computing device 700 receives a data packet comprising a plurality of training fields, wherein the plurality of training fields comprise a training field, wherein the training field comprises a plurality of tones, and wherein the plurality of tones comprise a first tone and a second tone. For example, computing device 700 may receive any of the data packets discussed in relation to FIG. 1. The data packets may have training fields such as 112a-112b, 132a-132b, and 152a-152b. Each training field may correspond to a channel identified by rx and ltf values. Each training field may include data that can be represented, using Fast Fourier Transform, as a plurality of N tones, wherein each tone is identified by a number k, 1≤k≤N. The first and second tones may be tones identified by k=1 and k=2.

At block 604, computing device 700 modifies the first tone based on a predetermined signal associated with the first tone. Computing device 700 may remove the polarity of the first tone using the processes described in relation to blocks 202 and 252. The predetermined signal associated with the first tone may be $s_k$, which is used to remove the polarity of the first tone.

At block 606, computing device 700 stores the first tone in a data structure associated with the first tone. For example, the first tone may be stored in matrix $\tilde{H}_k$ in process 250, and in matrix $\hat{H}_k$ in process 200. Each of these matrices is associated with a tone k.

At block 608, computing device 700 modifies the data structure based on the second tone. For example, computing device 700 performs channel estimation enhancement for the first tone using information from an adjacent tone, as described in relation to blocks 206 and 256. This may result in values $(\hat{h}_{smoothed,k})_{rx,ss}$ or $(\tilde{h}_{smoothed,k})_{rx,ltf}$. In some embodiments, certain channels or tones may be excluded from the processes described in blocks 206 and 256. This exclusion is explained in relation to FIGS. 4 and 5.

Figure 7:
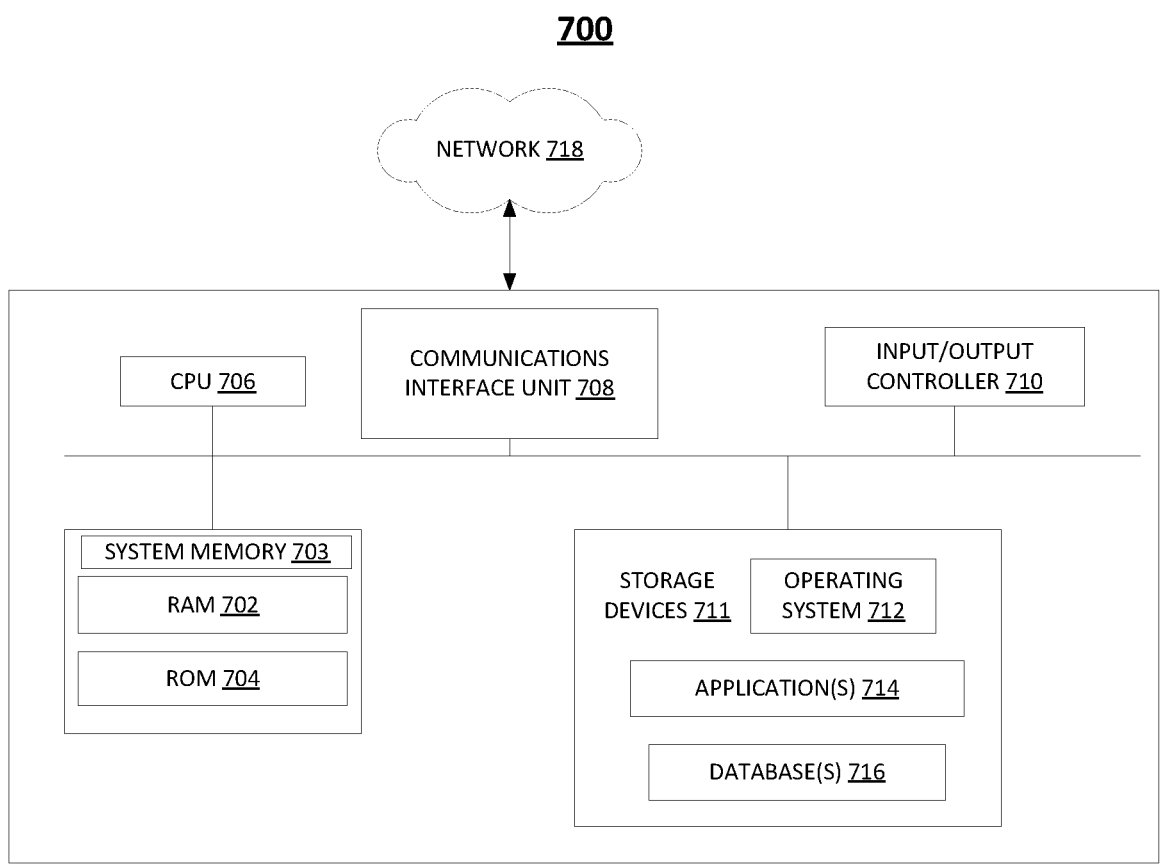
FIG. 7 shows a block diagram of a computing device, for performing any of the processes described herein, in accordance with some embodiments of the present disclosure.

FIG. 7 is a block diagram 700 of a computing device, for performing any of the processes described herein, in accordance with an embodiment of the disclosure. Each of the components of these systems may be implemented on one or more computing devices 700. In certain aspects, a plurality of the components of these systems may be included within one computing device 700. In certain embodiments, a component and a storage device 711 may be implemented across several computing devices 700.

The computing device 700 comprises at least one communications interface unit 708, an input/output controller 710, system memory 703, and one or more data storage devices 711. The system memory 703 includes at least one random access memory (RAM 702) and at least one read-only memory (ROM 704). All of these elements are in communication with a central processing unit (CPU 706) to facilitate the operation of the computing device 700. The computing device 700 may be configured in many different ways. For example, the computing device 700 may be a conventional standalone computer or, alternatively, the functions of computing device 700 may be distributed across multiple computer systems and architectures. In FIG. 7, the computing device 700 is linked, via network 718 or local network, to other servers or systems.

The computing device 700 may be configured in a distributed architecture, wherein databases and processors are housed in separate units or locations. Some units perform primary processing functions and contain, at a minimum, a general controller or a processor and a system memory 703. In distributed architecture embodiments, each of these units may be attached via the communications interface unit 708 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to, Ethernet, SAP, SAS™, ATP, BLUETOOTH™, GSM and TCP/IP. Computing device 700 may use communications interface unit 708 to retrieve and receive data from a remote location. Communications interface unit 708 may include a plurality of receiver antennas, each receiving packets as described in relation to FIG. 1.

The CPU 706 comprises a processor with control circuitry, such as one or more conventional microprocessors and one or more supplementary co-processors such as math co-processors for offloading workload from the CPU 706. The CPU 706 is in communication with the communications interface unit 708 and the input/output controller 710, through which the CPU 706 communicates with other devices such as other servers, user terminals, or devices. The communications interface unit 708 and the input/output controller 710 may include multiple communication channels for simultaneous communication with, for example, other processors, servers or client terminals.

The CPU 706 is also in communication with the data storage device 711. The data storage device 711 may comprise an appropriate combination of storage circuitry such as magnetic, optical or semiconductor memory, and may include, for example, RAM 702, ROM 704, a flash drive, an optical disc such as a compact disc or a hard disk or drive. The CPU 706 and the data storage device 711 each may be, for example, located entirely within a single computer or other computing device, or connected to each other by a communication medium, such as a USB port, serial port cable, a coaxial cable, an Ethernet cable, a telephone line, a radio frequency transceiver or other similar wireless or wired medium or combination of the foregoing. For example, the CPU 706 may be connected to the data storage device 711 via the communications interface unit 708. The CPU 706 may be configured to perform one or more particular processing functions.

The data storage device 711 may store, for example, (i) an operating system 712 for the computing device 700; (ii) one or more applications 714 (e.g., computer program code or a computer program product) adapted to direct the CPU 706 in accordance with the systems and methods described here, and particularly in accordance with the processes described in detail with regard to the CPU 706; or (iii) database(s) 716 adapted to store information that may be utilized to store information required by the program. In some embodiments, data storage device 711 may store the values and matrices calculated in processes 200 and 250. In some embodiments, data storage device 711 may store a list of channels and/or tones to be excluded, as described above.

The operating system 712 and applications 714 may be stored, for example, in a compressed, an uncompiled and an encrypted format, and may include computer program code. The instructions of the program may be read into a main memory of the processor from a computer-readable medium other than the data storage device 711, such as from the ROM 704 or from the RAM 702. While execution of sequences of instructions in the program causes the CPU 706 to perform the process operations described herein, hard-wired circuitry may be used in place of, or in combination with, software instructions for embodiment of the processes of the present disclosure. Thus, the systems and methods described are not limited to any specific combination of hardware and software.

Suitable computer program code may be provided for performing one or more functions in relation to determining a decoding order of a SIC receiver as described herein. The program also may include program elements such as an operating system 712, a database management system and "device drivers" that allow the processor to interface with computer peripheral devices (e.g., a video display, a keyboard, a computer mouse, a touchscreen, a microphone, a camera, a speaker, headphones etc.) via the input/output controller 710.

The term "computer-readable medium" as used herein refers to any transitory or non-transitory medium that provides or participates in providing instructions to the processor of the computing device 700 (or any other processor of a device described herein) for execution. Such a medium may take many forms, including, but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer may read.

Various forms of computer-readable media may be involved in carrying one or more sequences of one or more instructions to the CPU 706 (or any other processor of a device described herein) for execution. For example, the instructions may initially be borne on a magnetic disk of a remote computer (not shown). The remote computer may load the instructions into its dynamic memory and send the instructions over an Ethernet connection, cable line, or even telephone line using a modem. A communications device local to a computing device 700 (e.g., a server) may receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

It is contemplated that the steps or descriptions of the above figures may be used with any other embodiment of this disclosure. In addition, the steps and descriptions described in this disclosure may be done in alternative orders or in parallel to further the purposes of this disclosure.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and that their equivalents be covered thereby.

The foregoing is merely illustrative of the principles of this disclosure, and various modifications can be made without departing from the scope of the present disclosure. The above-described embodiments of the present disclosure are presented for purposes of illustration and not of limitation, and the present disclosure is limited only by the claims that follow.

What is claimed is:

1. A method for channel estimation for multi-stream packets, the method comprising:
   receiving, from a wireless channel and at a wireless receiver, a data packet having a training field;
   generating a combination of a plurality of values representing the training field in the frequency domain, each value corresponding to a respective tone from a plurality of tones that are used in a frequency domain transformation;
   for a first value from the plurality of values, computing a revised first value that removes a polarity of the first value based on a predetermined signal associated with a first tone from the plurality of tones, wherein the pre-determined signal is indicative of a data symbol corresponding to the training field originally transmitted in the data packet;

storing the revised first value in a first data structure associated with the first tone; and generating a channel estimate of the wireless channel based at least in part on the first data structure.

2. The method of claim 1, wherein the generating the channel estimate comprises:

determining whether the first tone and a second tone that is adjacent to the first tone are coherent in frequency;

in response to determining that the first tone and a second tone that is adjacent to the first tone are not coherent in frequency, excluding the first tone and the second tone from a channel profile indicative of channel characteristics of the wireless channel.

3. The method of claim 1, further comprising:

modifying the first data structure based on a Hermitian of a polarity pattern matrix.

4. The method of claim 3, wherein modifying the first data structure comprises creating a matrix wherein each column of the matrix corresponds to a data stream of the data packet and each row of the matrix corresponds to a receiver of the data packet.

5. The method of claim 1, wherein the first data structure is a matrix wherein each column of the matrix corresponds to a training field of the plurality of training fields and each row of the matrix corresponds to a receiver of the data packet.

6. The method of claim 1, further comprising:

determining a mean deviation in phase difference associated with a second tone;

comparing the mean deviation to a threshold;

determining, based on the comparing, that the mean deviation is greater than the threshold; and storing the second tone in a second data structure associated with the second tone, wherein the second data structure is not modified based on any other tone of the plurality of tones.

7. The method of claim 6, further comprising:

identifying a second tone associated with a data stream of the data packet and a receiver of the data packet, wherein a subset of the plurality of tones is associated with the data stream and the receiver, and further comprising storing each tone in the subset in a respective data structure associated with the respective tone, wherein the respective data structure is not modified based on any other tone of the plurality of tones.

8. The method of claim 1, further comprising:

determining a magnitude associated with a second tone;

comparing the magnitude to a threshold;

determining, based on the comparing, that the magnitude is less than the threshold; and storing the second tone in a second data structure associated with the second tone, wherein the second data structure is not modified based on any other tone of the plurality of tones.

9. The method of claim 8, further comprising storing a third tone adjacent to the second tone in a third data structure associated with the third tone, wherein the third data structure is not modified based on any other tone of the plurality of tones.

10. The method of claim 1, wherein generating the channel estimate of the wireless channel based at least in part on the first data structure further comprises:

determining an average phase difference;

removing the average phase difference from the first tone and a second tone;

smoothing the first tone based on the second tone; and combining the average phase difference with the first tone.

11. A system for channel estimation for multi-stream packets, the system comprising:

a wireless receiver configured to receive, from a wireless channel, a data packet having a training field;

a processor configured to:

generate a combination of a plurality of values representing the training field in the frequency domain, each value corresponding to a respective tone from a plurality of tones that are used in a frequency domain transformation;

for a first value from the plurality of values, compute a revised first value that removes a polarity of the first value based on a predetermined signal associated with a first tone from the plurality of tones, wherein the pre-determined signal is indicative of a data symbol corresponding to the training field originally transmitted in the data packet;

store the revised first value in a first data structure associated with the first tone; and generate a channel estimate of the wireless channel based at least in part on the first data structure.

12. The system of claim 11, wherein the processor, when generating the channel estimate, is further configured to:

determine whether the first tone and a second tone that is adjacent to the first tone are coherent in frequency;

in response to determining that the first tone and a second tone that is adjacent to the first tone are not coherent in frequency, exclude the first tone and the second tone from a channel profile indicative of channel characteristics of the wireless channel.

13. The system of claim 11, wherein the processor is further configured to:

modify the first data structure based on a Hermitian of a polarity pattern matrix.

14. The system of claim 13, wherein the processor is further configured to modify the first data structure comprises creating a matrix wherein each column of the matrix corresponds to a data stream of the data packet and each row of the matrix corresponds to a receiver of the data packet.

15. The system of claim 11, wherein the first data structure is a matrix wherein each column of the matrix corresponds to a training field of the plurality of training fields and each row of the matrix corresponds to a receiver of the data packet.

16. The system of claim 11, wherein the processor is further configured to:

determine a mean deviation in phase difference associated with a second tone;

compare the mean deviation to a threshold;

determine, based on the comparing, that the mean deviation is greater than the threshold; and store the second tone in a second data structure associated with the second tone, wherein the second data structure is not modified based on any other tone of the plurality of tones.

17. The system of claim 16, wherein the processor is further configured to:

identify a second tone associated with a data stream of the data packet and a receiver of the data packet, wherein a subset of the plurality of tones is associated with the data stream and the receiver; and store each tone in the subset in a respective data structure associated with the respective tone, wherein the respective data structure is not modified based on any other tone of the plurality of tones.

18. The system of claim 11, wherein the processor is further configured to:
    determine a magnitude associated with a second tone;
    compare the magnitude to a threshold;
    determine, based on the comparing, that the magnitude is less than the threshold; and
    store the second tone in a second data structure associated with the second tone, wherein the second data structure is not modified based on any other tone of the plurality of tones.

19. The system of claim 18, wherein the processor is further configured to:
    store a third tone adjacent to the second tone in a third data structure associated with the third tone, wherein the third data structure is not modified based on any other tone of the plurality of tones.

20. The system of claim 11, wherein the processor, when generating the channel estimate of the wireless channel based at least in part on the first data structure, is further configured to:
    determine an average phase difference;
    remove the average phase difference from the first tone and a second tone;
    smooth the first tone based on the second tone; and
    combine the average phase difference with the first tone.

* * * * *